United States Patent
Obuchi

(10) Patent No.: US 11,009,589 B2
(45) Date of Patent: May 18, 2021

(54) VEHICLE EXTERIOR ENVIRONMENT RECOGNITION APPARATUS

(71) Applicant: SUBARU CORPORATION, Tokyo (JP)

(72) Inventor: Katsuhiko Obuchi, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 335 days.

(21) Appl. No.: 16/024,704

(22) Filed: Jun. 29, 2018

(65) Prior Publication Data

US 2019/0064321 A1  Feb. 28, 2019

(30) Foreign Application Priority Data

Aug. 24, 2017  (JP) .............................. JP2017-161592

(51) Int. Cl.
*G01S 7/41* (2006.01)
*G01S 13/931* (2020.01)
(Continued)

(52) U.S. Cl.
CPC .............. *G01S 7/41* (2013.01); *G01S 13/931* (2013.01); *G06K 9/00805* (2013.01);
(Continued)

(58) Field of Classification Search
CPC ... G01S 7/41; G01S 7/931; G01S 7/42; G01S 7/867; G06K 9/00805; G06K 9/6288;
(Continued)

(56) References Cited

U.S. PATENT DOCUMENTS 5,986,601 A * 11/1999 Sugimoto ............... G01S 7/415
   342/70
6,567,737 B2 * 5/2003 Nakamura ............ B60W 30/16
   701/96

(Continued)

FOREIGN PATENT DOCUMENTS

JP  2006-321421 A  11/2006
JP  2017-056783 A   3/2017
(Continued)

OTHER PUBLICATIONS

Japanese Office Action issued in corresponding Japanese Patent Application No. 2017-161592, dated Apr. 16, 2019, with English Translation.

*Primary Examiner* — Erin F Heard
*Assistant Examiner* — Michael W Justice
(74) *Attorney, Agent, or Firm* — McDermott Will & Emery LLP

(57) ABSTRACT

A vehicle exterior environment recognition apparatus includes radar, a locus calculator, a lane shape recognizer, a rate-of-coincidence calculator, and a three-dimensional object reality determiner. The radar makes distance measurement of a three-dimensional object outside an own vehicle, and outputs a representative point that indicates a relative position of the three-dimensional object to the own vehicle. The locus calculator calculates a locus of the representative point within a set range. The lane shape recognizer recognizes a lane shape of a lane corresponding to the representative point. The rate-of-coincidence calculator calculates a rate of coincidence of a shape of the locus of the representative point with the lane shape. The three-dimensional object reality determiner determines, on the basis of the rate of coincidence, whether or not the three-dimensional object corresponding to the representative point is real.

6 Claims, 13 Drawing Sheets

(51) Int. Cl.
*G06K 9/00* (2006.01)
*G01S 13/86* (2006.01)
*G06K 9/62* (2006.01)
*G01S 13/42* (2006.01)

(52) U.S. Cl.
CPC ............. *G01S 13/42* (2013.01); *G01S 13/867* (2013.01); *G01S 2013/9315* (2020.01); *G01S 2013/9322* (2020.01); *G01S 2013/93274* (2020.01); *G06K 9/6288* (2013.01)

(58) Field of Classification Search
CPC ....... G06K 9/00812; G06K 2013/9322; G06K 2013/9315; G06K 2013/93274; G06K 13/931
USPC .......................................................... 342/146
See application file for complete search history.

(56) References Cited

U.S. PATENT DOCUMENTS

| | | | | |
|---|---|---|---|---|
| 8,200,409 | B2* | 6/2012 | Sawamoto | B60W 30/17 701/96 |
| 9,555,802 | B2* | 1/2017 | Aoki | B60W 30/16 |
| 9,664,787 | B2* | 5/2017 | Kim | G01S 13/867 |
| 2002/0044080 | A1* | 4/2002 | Shirai | G01S 13/931 342/70 |
| 2002/0049539 | A1* | 4/2002 | Russell | G05D 1/0257 701/301 |
| 2003/0218563 | A1* | 11/2003 | Miyahara | G01S 13/723 342/70 |
| 2004/0167717 | A1* | 8/2004 | Buchanan | G01S 13/867 701/301 |
| 2008/0065328 | A1* | 3/2008 | Eidehall | G01S 7/295 701/301 |
| 2011/0285574 | A1 | 11/2011 | Tsunekawa | |
| 2014/0306844 | A1* | 10/2014 | Kim | G01S 13/867 342/385 |
| 2015/0025789 | A1* | 1/2015 | Einecke | G06K 9/00805 701/408 |
| 2015/0120137 | A1* | 4/2015 | Zeng | B62D 15/0265 701/41 |

FOREIGN PATENT DOCUMENTS

| | | |
|---|---|---|
| JP | 2017-117345 A | 6/2017 |
| WO | 2010/070708 A1 | 6/2010 |

* cited by examiner

VEHICLE EXTERIOR ENVIRONMENT RECOGNITION APPARATUS

CROSS-REFERENCE TO RELATED APPLICATIONS

The present application claims priority from Japanese Patent Application No. 2017-161592 filed on Aug. 24, 2017, the entire contents of which are hereby incorporated by reference.

BACKGROUND

The technology relates to a vehicle exterior environment recognition apparatus that recognizes objects such as vehicles around an own vehicle with the use of radar.

Recently, various techniques have been proposed and put into practical use regarding travel control apparatuses for vehicles. The travel control apparatuses recognize travel environment, and detect information regarding how an own vehicle travels, to execute a steering control and an acceleration-deceleration control in cooperation, allowing for automated driving.

Various proposals have been also made for vehicle exterior environment recognition apparatuses used in, for example, such travel control apparatuses. For example, Japanese Unexamined Patent Application Publication (JP-A) No. 2017-117345 describes a technique involving a radar set and an image-capturing unit. The radar set is fitted at a front end of an own vehicle, and sends out a radio-frequency signal of a millimeter-wave band as a transmission wave. The image-capturing unit is attached to a vehicle-widthwise midpoint of the vehicle at a predetermined height. The image-capturing unit may include, for example, a CCD (charge coupled device) camera that captures an image of a range of a predetermined angle frontward of the vehicle. The technique includes performing fusion of a radar object, i.e., an object sensed by the radar set, with an object sensed by the image-capturing unit, to generate a fusion object.

SUMMARY

An aspect of the technology provides a vehicle exterior environment recognition apparatus that includes radar, a locus calculator, a lane shape recognizer, a rate-of-coincidence calculator, and a three-dimensional object reality determiner. The radar is configured to make distance measurement of a three-dimensional object outside an own vehicle, and output a representative point that indicates a relative position of the three-dimensional object to the own vehicle. The locus calculator is configured to calculate a locus of the representative point within a set range. The lane shape recognizer is configured to recognize a lane shape of a lane corresponding to the representative point. The rate-of-coincidence calculator is configured to calculate a rate of coincidence of a shape of the locus of the representative point with the lane shape. The three-dimensional object reality determiner is configured to determine, on the basis of the rate of coincidence, whether or not the three-dimensional object corresponding to the representative point is real.

An aspect of the technology provides a vehicle exterior environment recognition apparatus that includes radar and circuitry. The radar is configured to make distance measurement of a three-dimensional object outside an own vehicle, and output a representative point that indicates a relative position of the three-dimensional object to the own vehicle. The circuitry is configured to calculate a locus of the representative point within a set range. The circuitry is configured to recognize a lane shape of a lane corresponding to the representative point. The circuitry is configured to calculate a rate of coincidence of a shape of the locus of the representative point with the lane shape. The circuitry is configured to determine, on the basis of the rate of coincidence, whether or not the three-dimensional object corresponding to the representative point is real.

DETAILED DESCRIPTION

Figure 1:
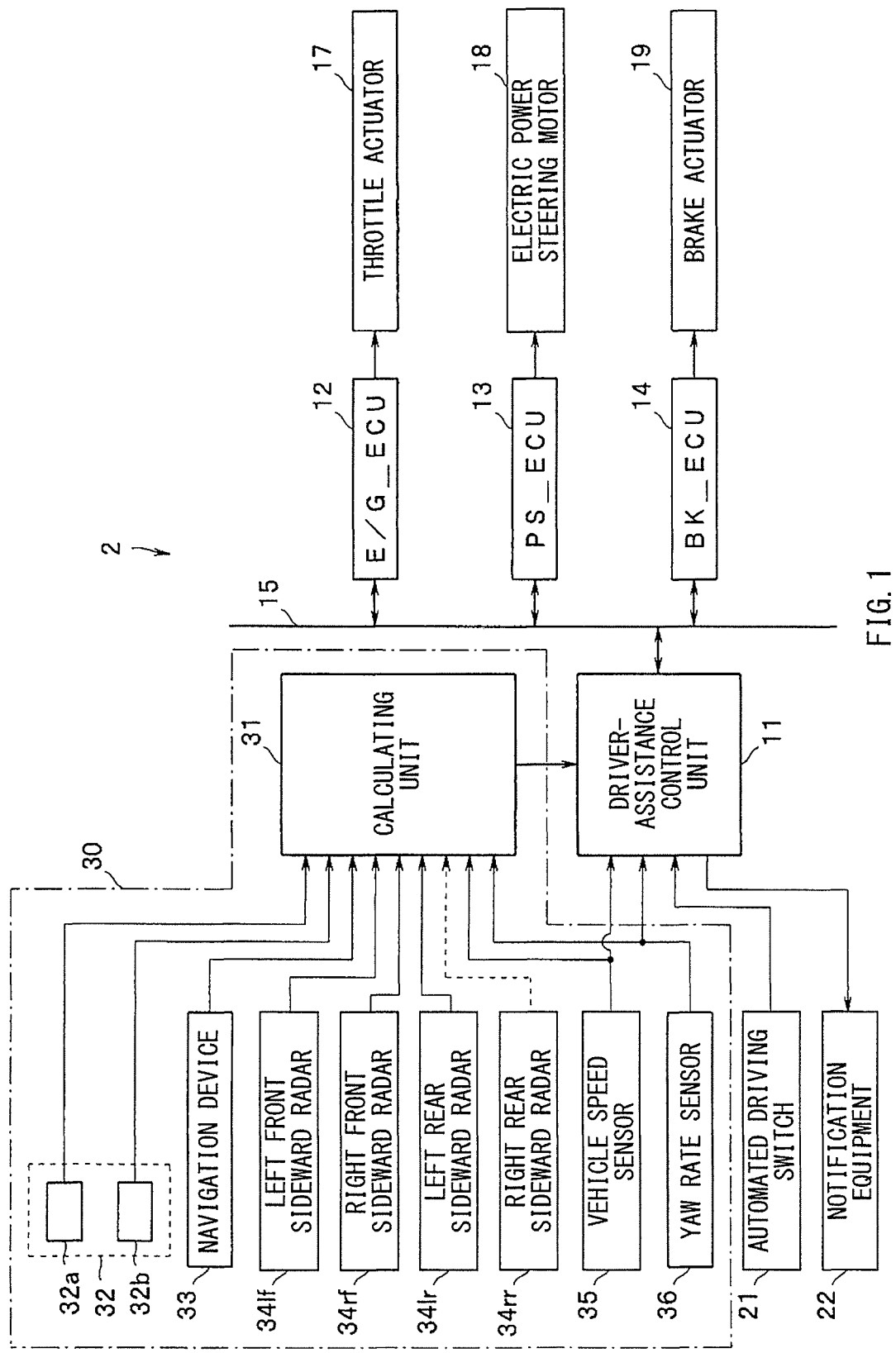
FIG. 1 is a block diagram illustrating a configuration of a vehicle driver-assistance apparatus.

In the following, some implementations of the technology are described with reference to the accompanying drawings. Note that the following description is directed to illustrative examples of the disclosure and not to be construed as limiting to the technology. Factors including, without limitation, numerical values, shapes, materials, components, positions of the components, and how the components are coupled to each other are illustrative only and not to be construed as limiting to the technology. Further, elements in the following example implementations which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same reference numerals to avoid redundant description.

Regarding travel control apparatuses for vehicles, an investigation has been made into possibility that a control such as a lane change control and a passing control is performed upon a preset condition being satisfied. The lane change control includes allowing an own vehicle to make a lane change. The passing control includes allowing the own vehicle to pass by a preceding vehicle. To perform such a control, it is desirable to precisely recognize not only three-dimensional objects frontward of the own vehicle, e.g., a preceding vehicle, but also three-dimensional objects on an adjacent lane, e.g., a parallel-traveling vehicle traveling on the adjacent lane. The term "adjacent lane" means a lane adjacent to a lane on which the own vehicle is traveling.

Such an investigation, however, involves using both a radar set and an image-capturing unit together, not only on a front part of the own vehicle but also on side parts of the own vehicle, only to perform limited kinds of controls such as the lane change control and the passing control. This may result in possibility of, for example, a complicated structure and a cost increase.

A possible alternative may be, for example, to perform recognition of the three-dimensional objects such as the parallel-traveling vehicle, solely with the use of the radar set. But the radar set sometimes outputs a plurality of radar objects for a single vehicle, or outputs an unreal radar object because of a noise or a multipath. This may necessitate determining whether or not a radar object detected corresponds to a real three-dimensional object, e.g., the parallel-traveling vehicle.

It is desirable to provide a vehicle exterior environment recognition apparatus that makes it possible to precisely recognize an object such as a parallel-traveling vehicle, with a simple configuration.

Figure 2:
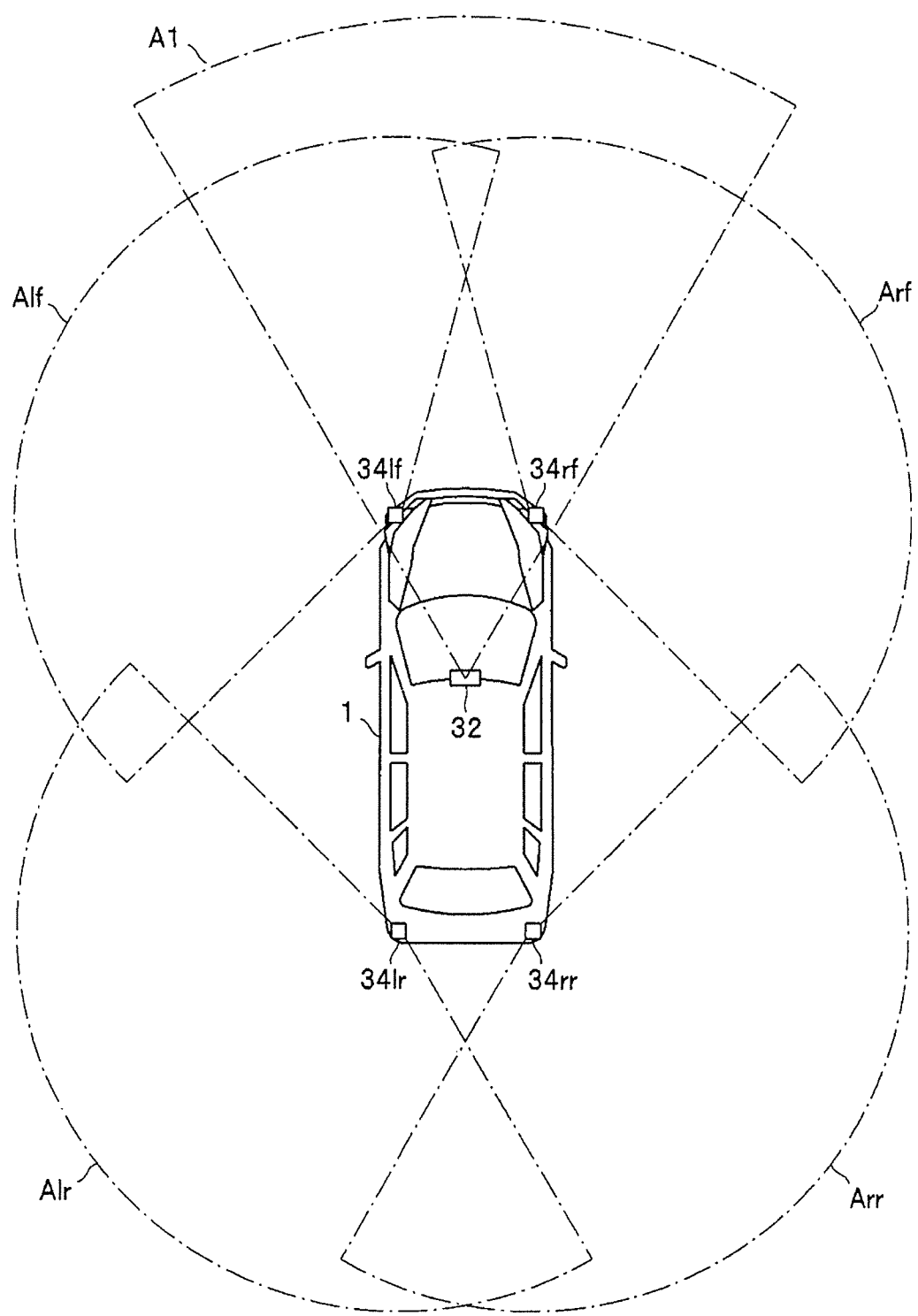
FIG. 2 describes search ranges of an on-vehicle camera and radar.
Figure 3:
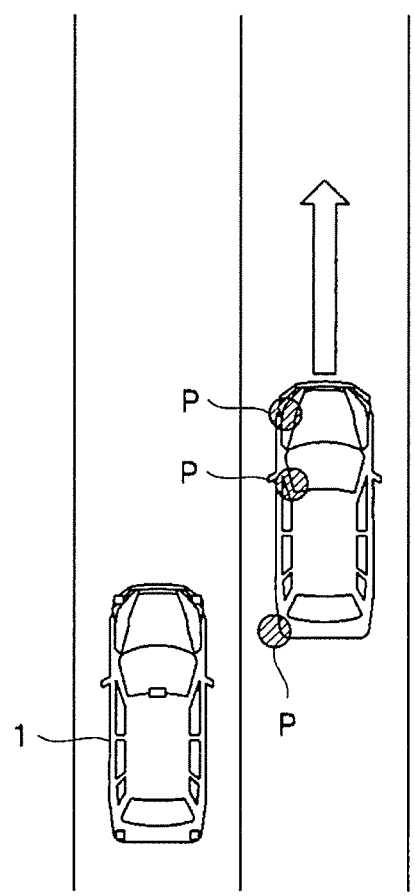
FIG. 3 describes examples of representative points of a radar object.
Figure 4:
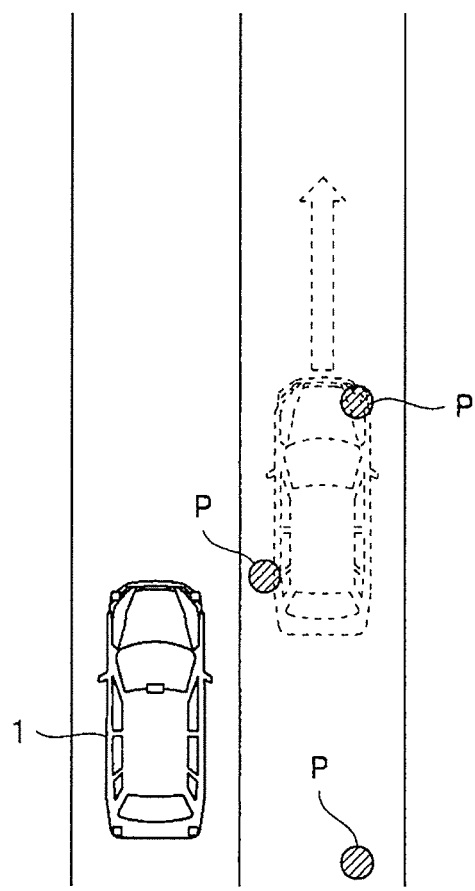
FIG. 4 describes examples of the representative points of the radar object.
Figure 5:
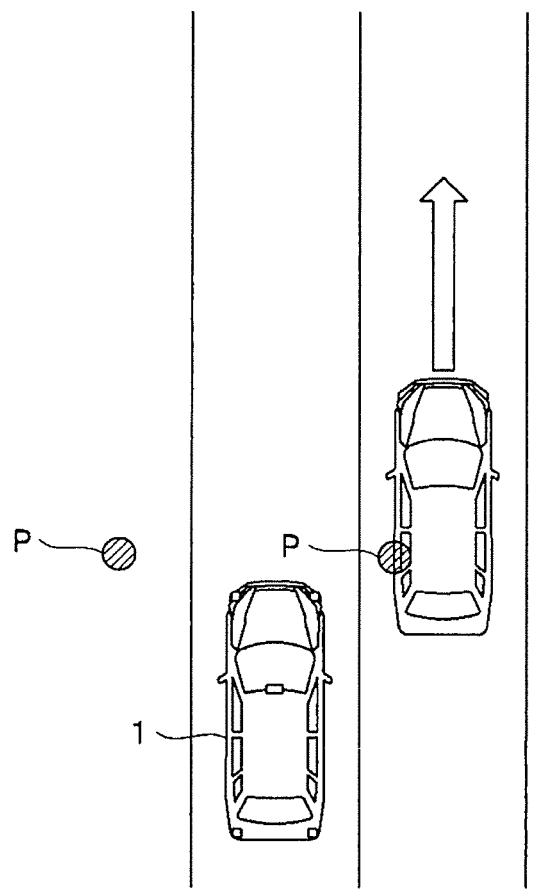
FIG. 5 describes examples of the representative points of the radar object.
Figure 6:
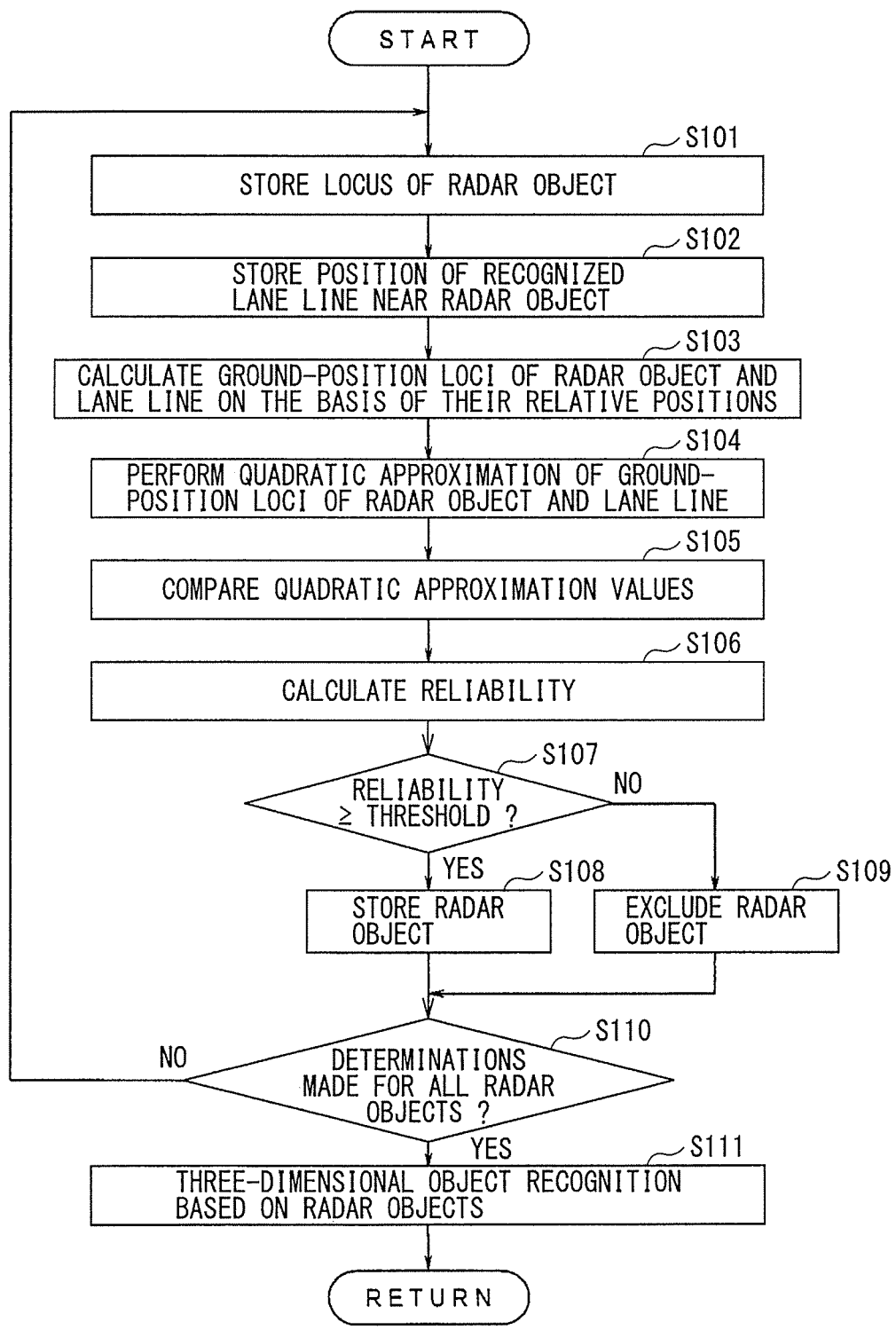
FIG. 6 is a flowchart illustrating a routine of three-dimensional object recognition with the use of the radar.
Figure 7:
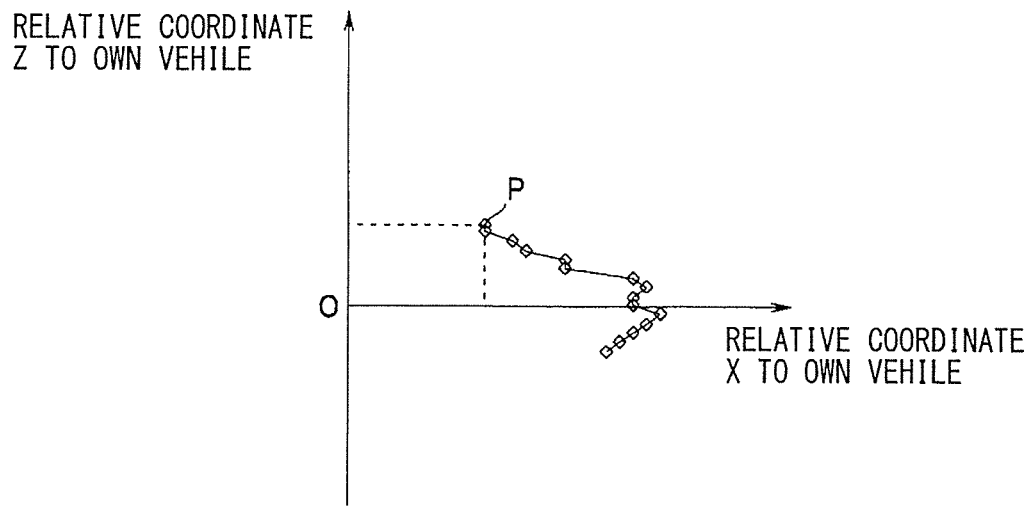
FIG. 7 describes an example of a locus of the representative point of the radar object with reference to an own vehicle.
Figure 8:
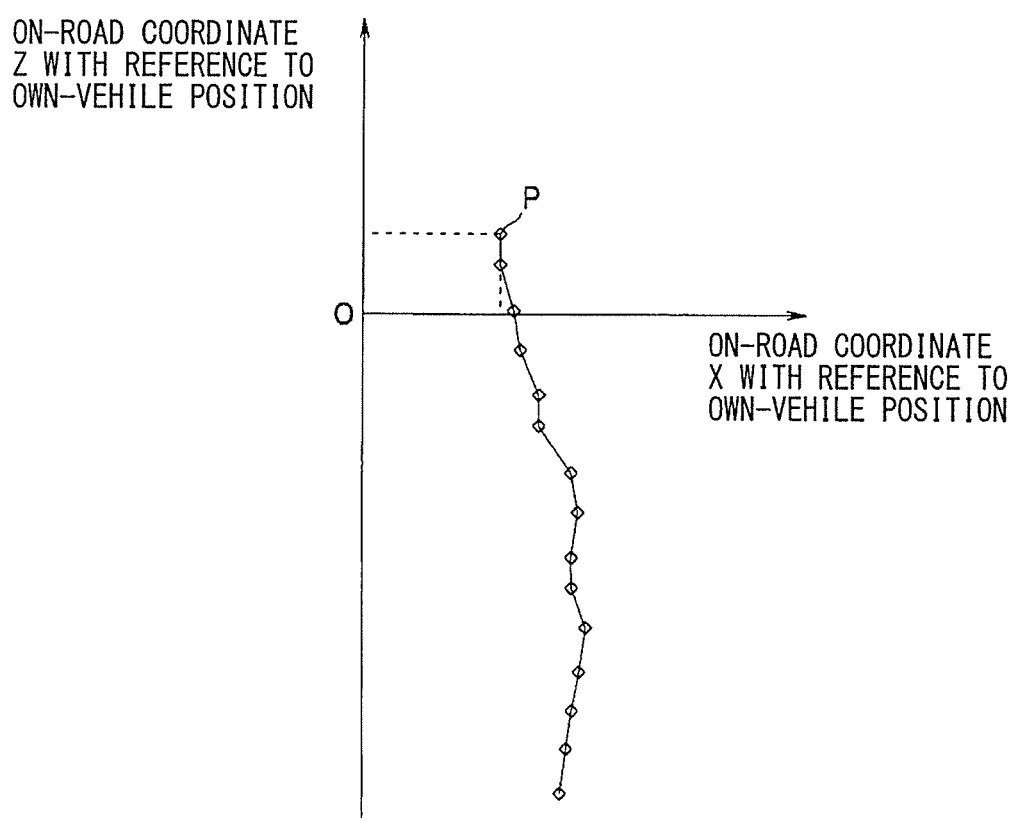
FIG. 8 describes an example of a locus of a ground position of the representative point of the radar object.
Figure 9:
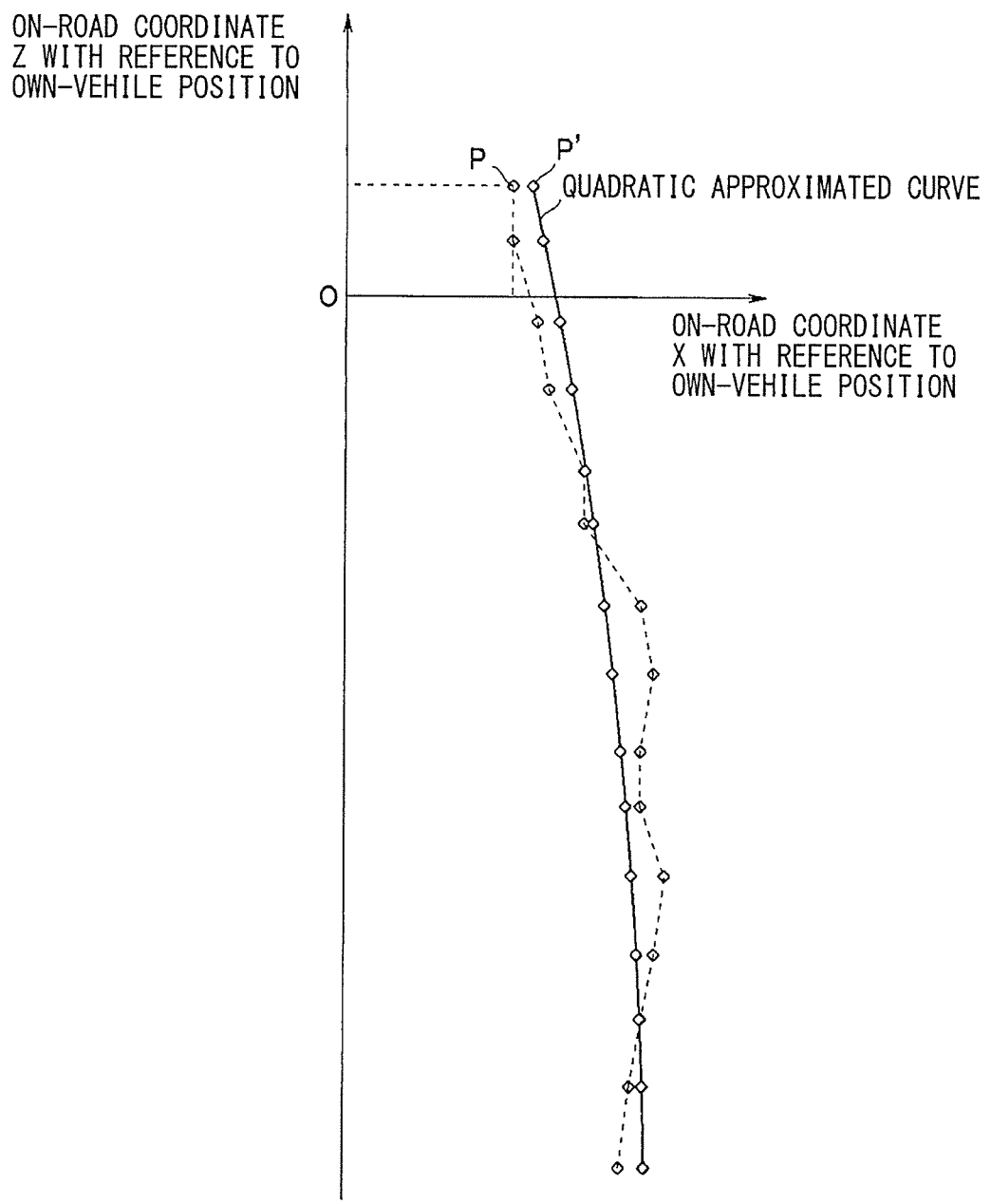
FIG. 9 describes an example of a quadratic approximated locus of the ground position.
Figure 10:
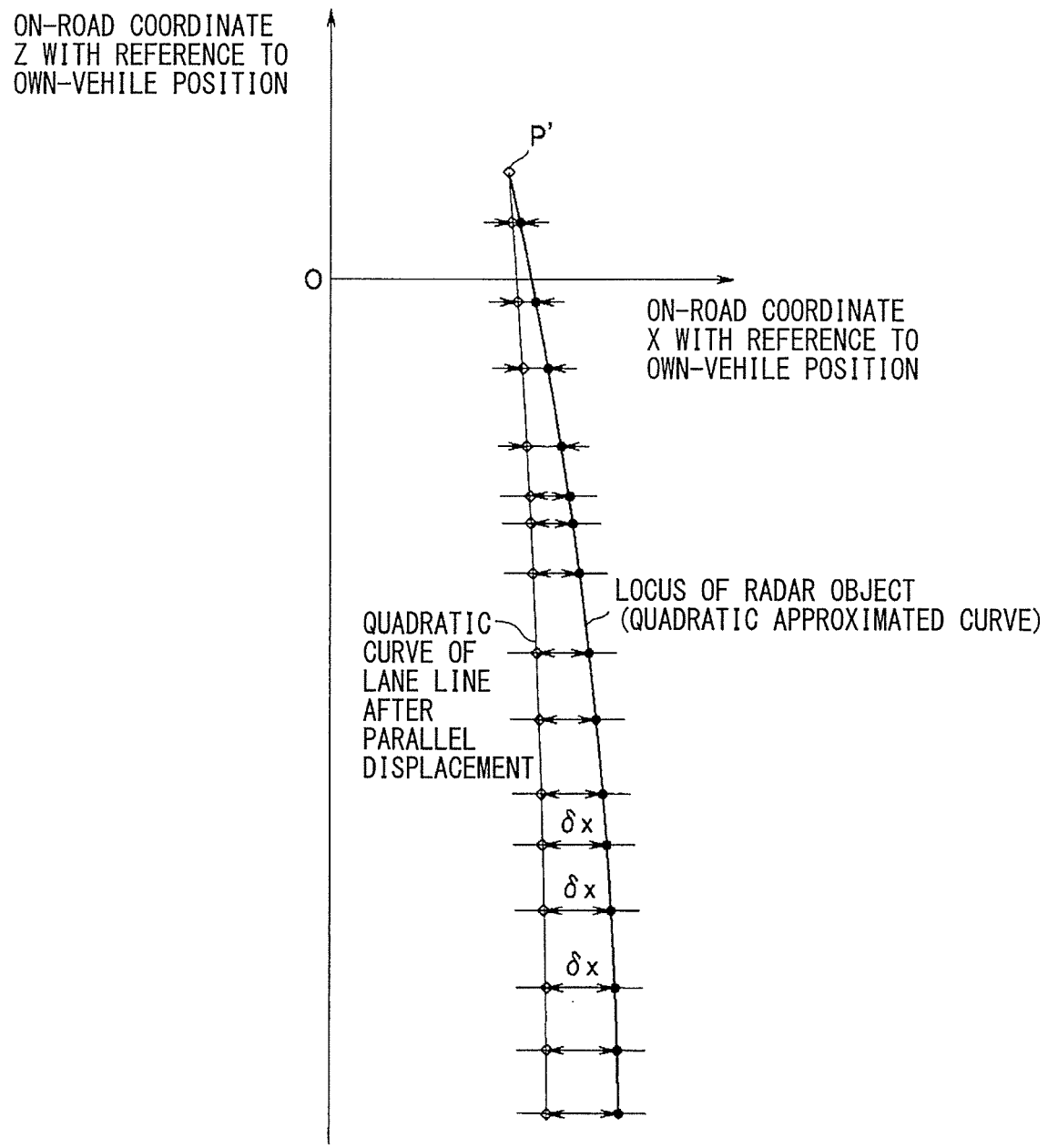
FIG. 10 describes an example of lateral positional differences between the locus of the ground position and a lane line of an adjacent lane.
Figure 11:
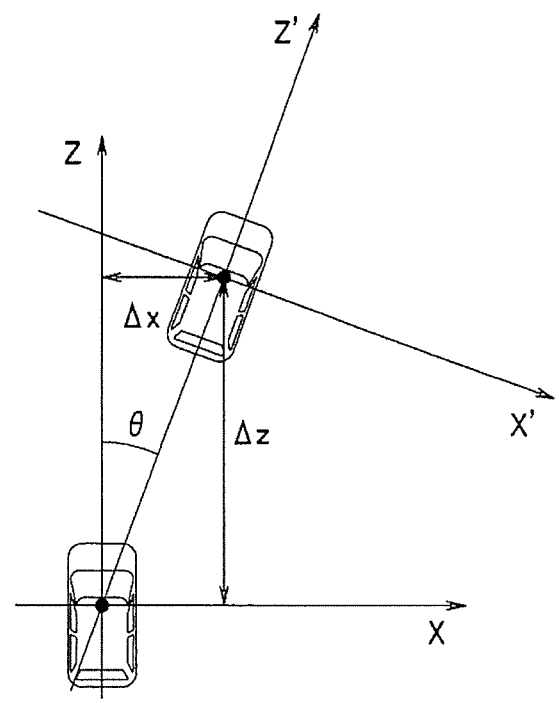
FIG. 11 describes an example of coordinate transformation in moving a preceding representative position of the own vehicle to a current representative position.
Figure 12:
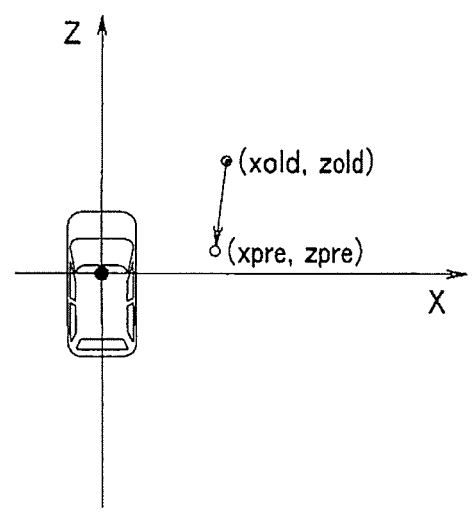
FIG. 12 describes a change in the ground position in accompaniment with movement of the own vehicle.
Figure 13:
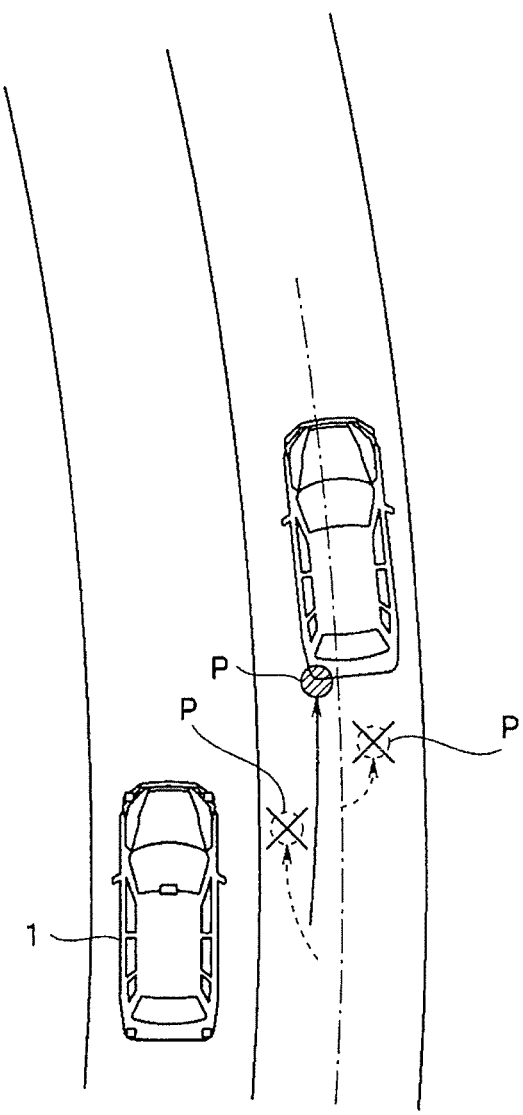
FIG. 13 describes an example of a result of the three-dimensional object recognition based on the radar object.
Figure 14:
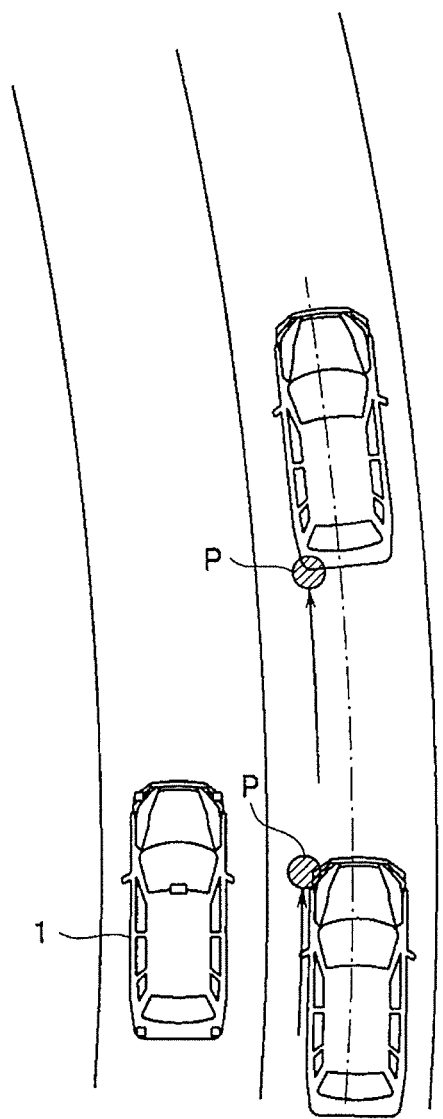
FIG. 14 describes an example of the result of the three-dimensional object recognition based on the radar object.
Figure 15:
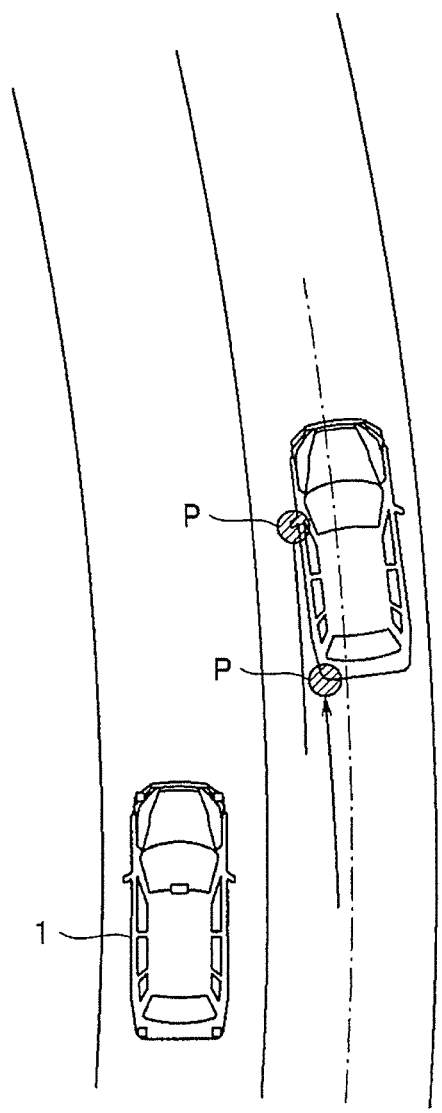
FIG. 15 describes an example of the result of the three-dimensional object recognition based on the radar object.

The accompanying drawings relate to example implementations of the technology. FIG. 1 is a block diagram illustrating a configuration of a vehicle driver-assistance apparatus. FIG. 2 describes search ranges of an on-vehicle camera and radar. FIGS. 3 to 5 describe examples of representative points of a radar object. FIG. 6 is a flowchart illustrating a routine of three-dimensional object recognition with the use of the radar. FIG. 7 describes an example of a locus of the representative point of the radar object with reference to an own vehicle. FIG. 8 describes an example of a locus of a ground position of the representative point of the radar object. FIG. 9 describes an example of a quadratic approximated locus of the ground position. FIG. 10 describes an example of lateral positional differences between the locus of the ground position and a lane line of an adjacent lane. FIG. 11 describes an example of coordinate transformation in moving a preceding representative position of the own vehicle to a current representative position. FIG. 12 describes a change in the ground position in accompaniment with movement of the own vehicle. FIGS. 13 to 15 describe examples of a result of the three-dimensional object recognition based on the radar object.

FIG. 1 illustrates a vehicle driver-assistance apparatus 2. The vehicle driver-assistance apparatus 2 may be mounted on a vehicle such as an automobile, i.e., an own vehicle 1. For the own vehicle 1, refer to FIG. 2. The vehicle driver-assistance apparatus 2 may include control units such as a driver-assistance control unit 11, an engine control unit (hereinafter abbreviated as E/G_ECU (electronic control unit)) 12, a power steering control unit (hereinafter abbreviated as PS_ECU) 13, and a brake control unit (hereinafter abbreviated as BK_ECU) 14. The control units 11 to 14 may be coupled through an in-vehicle communication line 15 such as a controller area network (CAN). It is to be noted that the control units 11 to 14 may each include a microcomputer including, for example, a central processing unit (CPU), a read only memory (ROM), and a random access memory (RAM). The ROM may store control programs that allow for operation set for each system.

To input side of the driver-assistance control unit 11, coupled may be a calculating unit 31 of a vehicle exterior environment recognition apparatus 30 described later. The calculating unit 31 may recognize various kinds of information as information regarding vehicle exterior environment. Non-limiting examples of the various kinds of information may include information regarding a traveling lane, an adjacent lane, a preceding vehicle, and a parallel-traveling vehicle. The traveling lane means a lane on which the own vehicle 1 travels. The adjacent lane means a lane adjacent to the traveling lane. The preceding vehicle means a vehicle that travels on the traveling lane. The parallel-traveling vehicle means a vehicle that travels on the adjacent lane. The calculating unit 31 may output the information recognized, to the driver-assistance control unit 11.

Moreover, to the input side of the driver-assistance control unit 11, coupled may be various sensors and switches. Non-limiting examples of the various sensors and switches may include a vehicle speed sensor 35, a yaw rate sensor 36, and an automated driving switch 21. The vehicle speed sensor 35 may detect an own-vehicle speed V, i.e., a vehicle speed of the own vehicle 1. The yaw rate sensor 36 may detect a yaw rate γ that acts on the own vehicle 1. Furthermore, to output side of the driver-assistance control unit 11, coupled may be notification equipment 22.

The automated driving switch 21 may be so located as to allow a driver to operate it. For example, the automated driving switch 21 may be located on, for example, an instrument panel or a steering wheel. The automated driving switch 21 may allow for selection between normal driving and automated driving at will. Turning OFF the automated driving switch 21 may allow for the selection of the normal driving. Turning ON the automated driving switch 21 may allow for the selection of the automated driving. The automated driving switch 21 may further allow for setting of a set vehicle speed at the time of ACC (adaptive cruise control) operation, and setting of a driving mode at the time of the automated driving. The driving mode at the time of the automated driving may be set to either a following control mode or a passing control mode.

Upon the following control mode being selected as the driving mode in the automated driving, the driver-assistance control unit 11 may perform a following control, through a control of the E/G_ECU 12, the PS_ECU 13, and the BK_ECU 14. For example, in a case with no preceding vehicles frontward on the traveling lane, the driver-assistance control unit 11 may perform a constant speed control. The constant speed control may include allowing the own vehicle 1 to travel on the traveling lane, while maintaining the own-vehicle speed V at the set vehicle speed. In a case of presence of a preceding vehicle frontward on the traveling lane, the driver-assistance control unit 11 may perform a following control. The following control may include allowing the own vehicle 1 to follow the preceding vehicle, while keeping a predetermined inter-vehicular distance. In this case, even if a vehicle speed of the preceding vehicle is equal to or lower than the set vehicle speed of the own vehicle 1, the driver-assistance control unit 11 may continue the following control without allowing the own vehicle 1 to pass by the preceding vehicle.

In a case where the passing control mode has been selected, the driver-assistance control unit 11 may basically perform the constant speed control or the following control as mentioned above. In a case where the vehicle speed of the preceding vehicle is lower than the set vehicle speed of the own vehicle 1 as is predetermined, the driver-assistance control unit 11 may perform the passing control, in order to keep the set vehicle speed of the own vehicle 1. However, even if the vehicle speed of the preceding vehicle is lower than the set vehicle speed of the own vehicle 1 as is predetermined, the driver-assistance control unit 11 may cancel the passing control, in a case of presence of, for example, a parallel-traveling vehicle on the adjacent lane.

The notification equipment 22 may notify the driver of a start and a stop of the automated driving, with the use of, for example, flashing indication, character display, and/or sound. The notification equipment 22 may include, for example, an indicator lamp, a display instrument, and a speaker.

To output side of the E/G_ECU 12, coupled may be a throttle actuator 17. The throttle actuator 17 may cause open and close operation of a throttle valve of an electronic control throttle provided in a throttle body of an engine. The throttle actuator 17 may cause the open and close operation of the throttle valve by a drive signal from the E/G_ ECU 12 to adjust a flow rate of intake air, and thereby generate a desired engine output.

To output side of the PS_ECU 13, coupled may be an electric power steering motor 18. The electric power steering motor 18 may impart steering torque to a steering mechanism by rotational power of a motor. In the automated driving, operation of the electric power steering motor 18 may be controlled by a drive signal from the PS_ECU 13, to cause execution of a lane keeping control and the lane change control. The lane keeping control may include allowing the own vehicle 1 to keep on traveling on the current traveling lane. The lane change control may be a lane change control for purposes of, for example, the passing control, and include moving the own vehicle 1 to the adjacent lane.

To output side of the BK_ECU 14, coupled may be a brake actuator 19. The brake actuator 19 may adjust brake hydraulic pressure to be supplied to brake wheel cylinders provided on respective wheels. Upon the brake actuator 19 being driven by a drive signal from the BK_ECU 14, the brake wheel cylinders may generate brake power for respective wheels, causing compulsive deceleration.

Description now moves on to details of a configuration of the vehicle exterior environment recognition apparatus 30.

To input side of the calculating unit 31, coupled may be an on-vehicle camera 32, a navigation device 33, left front sideward radar 34*lf*, right front sideward radar 34*rf*, left rear sideward radar 34*lr*, right rear sideward radar 34*rr*, the vehicle speed sensor 35, and the yaw rate sensor 36, which constitute a main part of the vehicle exterior environment recognition apparatus 30. The left front sideward radar 34*lf*, the right front sideward radar 34*rf*, the left rear sideward radar 34*lr*, and the right rear sideward radar 34*rr* are hereinafter collectively referred to as radar 34. In one implementation, the radar 34 may serve as "radar".

The on-vehicle camera 32 may be, for example, a stereo camera including a main camera 32*a* and a sub camera 32*b*. The main camera 32*a* and the sub camera 32*b* may be fixed to, for example, a front part of a cabin of the own vehicle 1, at a predetermined spacing in a vehicle-widthwise direction, i.e., a left-right direction. The main camera 32*a* and the sub camera 32*b* may be able to perform stereo imaging of a predetermined region A1 frontward in a traveling direction, as illustrated in FIG. 2, from different viewpoints on right and left sides.

Image data on the right and left sides captured by the on-vehicle camera 32 may be processed, for example, as follows. First, the calculating unit 31 may obtain distance information, from amounts of displacement between corresponding positions in a pair of images in the traveling direction of the own vehicle 1 captured by the main camera 32*a* and the sub camera 32*b*. Thus, the calculating unit 31 may generate a distance image. Thereafter, the calculating unit 31 may recognize objects on the basis of, for example, the distance image generated. Non-limiting examples of the objects may include a lane line, a sidewall that is present along a road, e.g., a guardrail and a curbstone, and a three-dimensional object. As to the three-dimensional object, the calculating unit 31 may recognize a kind or a category, a distance, a speed, a relative speed to the own vehicle 1, and preceding-vehicle information. The calculating unit 31 may output data thus recognized, to the driver-assistance control unit 11.

In recognizing the lane line, the calculating unit 31 may evaluate changes in luminance of pixels in a widthwise direction of the road, on the basis of knowledge that the lane line is higher in luminance than a road surface. Thus, the calculating unit 31 may identify, on an image plane, positions of dots of presumable lane lines on the right and left sides. A position (x, y, z) in real space of any one of the dots of the presumable lane line may be calculated by a known expression of coordinate transformation, on the basis of a position (i, j) on the image plane and parallax, i.e., the distance information, calculated regarding the position (i, j). A coordinate system in the real space may be set with reference to a position of the own vehicle 1. For example, the coordinate system in the real space may be defined, with a road surface directly below a midpoint of the main camera 32*a* serving as an origin O, with the vehicle-widthwise direction serving as an X axis, with a vehicle-heightwise direction serving as a Y axis, and with a vehicle-lengthwise direction serving as a Z axis. The dots of the presumable lane, converted onto the coordinate system in the real space, may be grouped into, for example, lines of dots that are close to one another, and be approximated as a quadratic curve, i.e., a lane-line approximation line, with the use of, for example, a least-squares method. In this implementation, in a case of presence of the adjacent lane that is adjacent to the traveling lane of the own vehicle 1, the calculating unit 31 may also recognize a lane line that divides the relevant adjacent lane. In other words, right and left lane-line recognition in this implementation may include recognizing not only the lane line that divides the traveling lane of the own vehicle 1 but also the lane line that divides the adjacent lane.

In recognizing the sidewall and the three-dimensional object, the calculating unit 31 may compare data on the distance image with a window. Non-limiting examples of the window may include three-dimensional sidewall data and three-dimensional object data that have been stored in advance. Thus, the calculating unit 31 may extract the sidewall data regarding, for example, the guardrail and the curbstone that are present along the road. The calculating unit 31 may also categorize the three-dimensional objects into a vehicle such as an automobile, a two-wheeled vehicle, a pedestrian, a telegraph pole, and other three-dimensional objects, and extract the three-dimensional object data regarding the three-dimensional objects thus categorized. In extracting the three-dimensional object data, the calculating unit 31 may calculate the relative speed of each of the three-dimensional objects to the own vehicle, from a rate of a chronological change in a distance, i.e., a relative distance, from the relevant three-dimensional object to the own vehicle 1. The calculating unit 31 may perform addition of the relative speed to the own-vehicle speed V, to calculate a speed of each of the three-dimensional objects. At this occasion, in particular, the three-dimensional object categorized into the vehicle may be further categorized into a stopped vehicle, the preceding vehicle, and an on-coming vehicle, on the basis of its speed. The stopped vehicle may be a vehicle the speed of which is substantially zero (0), with a frontward direction of the own vehicle 1 being positive. The preceding vehicle may be a vehicle closest to the own vehicle 1 among vehicles the speeds of which are positive, i.e., vehicles traveling in the same direction as the own vehicle 1. The on-coming vehicle may be a vehicle the speed of which is negative, i.e., a vehicle traveling toward the own vehicle 1.

The navigation device 33 may include a map database and a navigation ECU, both of which are undepicted. The map database may store map information. The map information may include data supplied by a supplier and data updated as is predetermined. The navigation ECU may generate route information that provides a navigation function.

The map database may store information involved in constituting a road map. Non-limiting examples of the information involved in constituting the road map may include node data and facility data. The node data may relate to positions and shapes of roads that constitute a map image. The node data may include data regarding coordinates, i.e., latitude and longitude, of an on-road point, or a node point. The node point may include, for example, a widthwise midpoint of a road, or a lane, and a junction, i.e., an intersection, of the road. The node data may further include data regarding a direction and a category of the road including the relevant node point, a type of the road at the relevant node point, and a curvature, or a radius, of a curve. Non-limiting examples of the category of the road may include information such as an expressway, a highway, and a city road. Non-limiting examples of the type of the road may include a linear section, a circular arc section or a circular-arc curve part, and a clothoid curve section or a relaxation curve part.

The navigation ECU may identify, for example, an own-vehicle position on map data, on the basis of positional information, i.e., latitude and longitude, of the own vehicle 1, the own-vehicle speed V, and information regarding a direction of movement of the own vehicle 1. The positional information of the own vehicle 1 may be acquired by receipt of a radio wave signal from a GPS (Global Positioning System) satellite. The own-vehicle speed V may be acquired from the vehicle speed sensor 35. The information regarding the direction of movement of the own vehicle 1 may be acquired from, for example, a magnetic field sensor or a gyro sensor. Thus, the navigation ECU may be able to recognize various pieces of information such as the traveling lane of the own vehicle 1 and the adjacent lane.

The radar 34 makes distance measurement of a three-dimensional object outside the own vehicle 1. In one specific but non-limiting example, the radar 34 may transmit a radar wave to outside the own vehicle 1, and receive a reflected wave from the three-dimensional object to make the distance measurement.

The left front sideward radar 34*lf* and the right front sideward radar 34*rf* may be, for example, millimeter-wave radar, and be respectively fitted on left and right side parts of a front bumper. The left front sideward radar 34*lf* may monitor a region Alf obliquely left frontward and sideward of the own vehicle 1, as illustrated in FIG. 2. The right front sideward radar 34*rf* may monitor a region Arf obliquely right frontward and sideward of the own vehicle 1, as illustrated in FIG. 2. The regions Alf and Arf are difficult to recognize with the images by the on-vehicle camera 32 as mentioned above.

The left rear sideward radar 34*lr* and the right rear sideward radar 34*rr* may be, for example, millimeter-wave radar, and be respectively fitted on left and right side parts of a rear bumper. The left rear sideward radar 34*lr* may monitor a region Alr sideward and rearward of the own vehicle 1, as illustrated in FIG. 2. The right rear sideward radar 34*rr* may monitor a region Arr sideward and rearward of the own vehicle 1, as illustrated in FIG. 2. The regions Alr and Arr are difficult for the left front sideward radar 34*lf* and the right front sideward radar 34*rf* as mentioned above to monitor.

The millimeter-wave radar that constitutes the radar 34 may transmit a radio wave, and perform analysis of a reflected wave from an object, to detect mainly the three-dimensional object such as the parallel-traveling vehicle and the subsequent vehicle as a radar object. In one specific but non-limiting example, the radar 34 may detect, as information regarding the radar object, a position of a representative point P of the three-dimensional object, i.e., the relative position to the own vehicle 1, and a speed of the representative point P of the three-dimensional object.

Basically, for one three-dimensional object, one representative point P of the radar object is outputted. However, in some cases, depending on a shape or other factors of the three-dimensional object, one three-dimensional object may be erroneously detected as a plurality of radar objects, resulting in detection of a plurality of the representative points P for one three-dimensional object, as illustrated in, for example, FIG. 3. Moreover, depending on observation conditions or other conditions, the representative point P of the radar object may be sometimes detected because of, for example, the noise, although there is no three-dimensional object, as illustrated in, for example, FIG. 4. Furthermore, for example, reflection of the radio wave from, for example, a sidewall or a guardrail, or refraction of the radio wave may cause the multipath, resulting in the detection of the representative point P other than the representative point P corresponding to the real three-dimensional object, as illustrated in, for example, FIG. 5.

It is desirable to exclude such an erroneously-detected radar object, and to appropriately perform the three-dimensional object recognition with the use of the radar 34. Thus, the calculating unit 31 may calculate a locus of the representative point P of the radar object, and recognize a lane shape of a lane on which the representative point P of the radar object is present, to calculate a rate of coincidence of the locus of the representative point P with the lane shape. The calculating unit 31 may determine, on the basis of the rate of coincidence calculated, whether or not the three-dimensional object corresponding to the locus of the representative point P is real. In one implementation, the calculating unit 31 may serve as a "locus calculator", a "lane shape recognizer", a "rate-of-coincidence calculator", and a "three-dimensional object reality determiner".

Description is given next of details of the three-dimensional object recognition based on the radar object, with reference to FIG. 6. FIG. 6 is the flowchart of the routine of the three-dimensional object recognition. The routine may be repetitively executed every set time, e.g., on sampling cycles by the radar 34. Upon a start of the routine, first, in step S101, the calculating unit 31 may select one radar object from the radar objects that are currently detected. The calculating unit 31 may store a locus of the relevant radar object. In other words, the calculating unit 31 may store a locus of the relative position of the radar object to the own vehicle 1 and the speed of the radar object.

In one specific but non-limiting example, upon the radar 34 newly detecting the representative point P of the radar object, the calculating unit 31 may update, for each identical radar object, the locus of the representative point P previously detected within a set range. The set range may be a range of a set time, e.g., 1 second, or a range of a set distance, e.g., 12 meters. The calculating unit 31 may store the locus updated. Refer to FIG. 7, for example.

In subsequent step S102, the calculating unit 31 may extract a position of a recognized lane line near each of the radar objects that are currently stored. In other words, the calculating unit 31 may extract the relative position of the lane line to the own vehicle 1. The calculating unit 31 may store the position of the recognized lane line thus extracted. In one specific but non-limiting example, in a case where the radar object is present on the adjacent lane, the calculating unit 31 may extract a position of the lane line that divides the adjacent lane, as the position of the recognized lane line near the relevant radar object. The calculating unit 31 may store the position of the lane line thus extracted that divides the adjacent line.

It is to be noted that for the extraction of the position of the recognized lane line, for example, lane-line information recognized on the basis of the stereo image by the on-vehicle camera 32 may be used. In a case where the lane line recognition based on the stereo image is difficult, lane-line information based on the map data may be used.

Thereafter, the flow may proceed to step S103. In step S103, the calculating unit 31 may convert the relative position of the radar object, i.e., the representative point P, to the own vehicle 1 stored in step S101, to a ground position. The calculating unit 31 may also convert the relative position of the lane line to the own vehicle 1, to a ground position. Thus, the calculating unit 31 may calculate a locus of the ground position of the radar object and a locus of the ground position of the lane line.

In this case, with Δt representing a sampling interval from detection of the previous representative point P of the radar object to detection of the new representative point P of the radar object, for example, as illustrated in FIG. 11, amounts of movement Δx and Δz of the own vehicle 1 in directions of the X axis and the Z axis in Δt seconds may be given by the following expressions (1) and (2).

$$\Delta x = V \cdot \Delta t \cdot \sin \theta \quad (1)$$

$$\Delta z = V \cdot \Delta t \cdot \cos \theta \quad (2)$$

Accordingly, for example, as illustrated in FIG. 12, with (x old, z old) representing coordinates of the representative point P previously detected, coordinates (x pre, z pre) to which the relevant representative point P is estimated to have moved up to the present time may be given by the following expressions (3) and (4).

$$x\ \text{pre} = (x\ \text{old} - \Delta x) \cdot \cos \theta - (z\ \text{old} - \Delta z) \cdot \sin \theta \quad (3)$$

$$z\ \text{pre} = (x\ \text{old} - \Delta x) \cdot \sin \theta + (z\ \text{old} - \Delta z) \cdot \cos \theta \quad (4)$$

In other words, the coordinates (x pre, z pre) may be obtained by subtracting the amounts of movement Δx and Δz of the own vehicle 1 from the coordinates (x old, z old), and thereafter performing coordinate transformation onto a current coordinate system (X', Z') fixed with respect to the vehicle.

The calculating unit 31 may sequentially and accumulatively perform such calculation for each of the representative points P on the sampling cycles, to generate a line of dots of the representative point P after the calculation. Refer to, for example, FIG. 8. It is to be noted that similar calculation may be performed for the locus of the ground position of the lane line.

Proceeding to step S104, the calculating unit 31 may perform quadratic approximation with use of, for example, the least-squares method, for the line of dots of each of the loci calculated in step S103. For example, for the quadratic approximation of the line of dots of the representative point P of the radar object, refer to FIG. 9. It is to be noted that in FIG. 9, reference character P' represents the representative point of the radar object after the quadratic approximation.

Proceeding to step S105, the calculating unit 31 may compare a quadratic approximated curve of the locus of the radar object with a quadratic curve of the corresponding lane line, to calculate the rate of coincidence for each of the representative points P.

For example, as illustrated in FIG. 10, the calculating unit 31 may cause parallel displacement of the quadratic curve of the lane line so that a lateral position, i.e., an x coordinate, of the quadratic curve of the lane line coincides with that of the newest representative point P of the radar object. Thus, the calculating unit 31 may calculate a deviation δx between each of the representative points P and the lane line. Thereafter, the calculating unit 31 may refer to, for example, a preset map, to calculate the rate of coincidence in accordance with the deviation δx. It is to be noted that the rate of coincidence calculated becomes higher as the deviation δx becomes smaller, for example.

Proceeding to step S106, the calculating unit 31 may calculate reliability of the radar object on the basis of the rate of coincidence of each of the representative points P' calculated. In one specific but non-limiting example, the calculating unit 31 may refer to, for example, a preset map, to calculate the reliability that becomes higher as an average value of the rates of coincidence of the representative points P' becomes higher. In this case, the calculating unit 31 may make a correction of the reliability calculated from the average value of the rates of coincidence, so that the reliability becomes lower as a minimum value of the rates of coincidence becomes smaller, to calculate final reliability.

Proceeding to step S107, the calculating unit 31 may check whether or not the reliability of the radar object calculated in step S106 is equal to or higher than a preset threshold.

In step S107, in a case where a determination has been made that the reliability of the radar object is equal to or higher than the threshold, the calculating unit 31 may proceed to step S108. In step S108, the calculating unit 31 may determine that the three-dimensional object corresponding to the radar object is highly possibly real. The calculating unit 31 may store the relevant radar object as a target of recognition, and thereafter, proceed to step S110.

Meanwhile, in step S107, in a case where a determination has been made that the reliability of the radar object is lower than the threshold, the calculating unit 31 may proceed to step S109. In step S109, the calculating unit 31 may determine that the three-dimensional object corresponding to the radar object is highly possibly unreal. The calculating unit 31 may exclude the relevant radar object from the target of recognition, and thereafter, proceed to step S110.

Proceeding to step S110 from step S108 or step S109, the calculating unit 31 may check whether or not determinations have been made for all the radar objects that are currently detected.

In step S110, upon determining that the determinations have not been made for all the radar objects, the calculating unit 31 may return to step S101.

Meanwhile, in step S110, upon determining that the determinations have been made for all the radar objects, the calculating unit 31 may proceed to step S111.

Proceeding to step S111 from step S110, the calculating unit 31 may perform the three-dimensional object recognition based on the radar objects that are currently stored, and thereafter, terminate the routine.

In this case, for example, as illustrated in FIGS. 13 and 14, the calculating unit may, basically, recognize the three-dimensional object such as the parallel-traveling vehicle for each of the radar objects that are currently stored. However, for example, as illustrated in FIG. 15, there may be cases where the representative points P of a plurality of the radar objects are present within a set distance, e.g., a vehicle length of a general vehicle. In such cases, the calculating unit 31 may determine that the plurality of the radar objects are an identical three-dimensional object, and recognize them as one three-dimensional object.

According to this implementation, the radar object is detected by the radar 34. The locus of the representative point P of the radar object within the set range is calculated. The lane shape corresponding to the representative point P of the radar object is recognized. The rate of coincidence of the shape of the locus of the representative point P with the lane shape recognized is calculated. On the basis of the rate of coincidence calculated, the determination is made as to whether or not the three-dimensional object corresponding to the locus of the representative point P is real. Hence, it is possible to precisely recognize objects such as a parallel-traveling vehicle, with a simple configuration.

In other words, the rate of coincidence of the shape of the locus of the representative point P of the radar object with the lane shape is calculated, in the light of the fact that the three-dimensional object such as the parallel-traveling vehicle moves along a lane on which the relevant three-dimensional object is present. The shape of the lane is obtainable separately as the vehicle exterior environment. On the basis of the rate of coincidence, the determination is made as to whether or not the three-dimensional object corresponding to the radar object is real. Accordingly, even in a case where an unreal three-dimensional object is erroneously detected as the radar object because of, for example, the noise or the multipath, it is possible to accurately exclude the erroneously-detected radar object. Hence, it is possible to precisely detect the three-dimensional object such as the parallel-traveling vehicle.

In this case, the comparison may be made between the quadratic approximated locus of the representative point P' and the lane shape, to calculate the rate of coincidence. Hence, even in a case with occurrence of, for example, sensing deviation of a position of the radar object, i.e., a position of the representative point P, it is possible to alleviate influences of the relevant sensing deviation, leading to precise calculation of the rate of coincidence.

Although some preferred implementations of the technology have been described in the foregoing by way of example with reference to the accompanying drawings, the technology is by no means limited to the implementations described above. It should be appreciated that modifications and alterations may be made by persons skilled in the art without departing from the scope as defined by the appended claims. The technology is intended to include such modifications and alterations in so far as they fall within the scope of the appended claims or the equivalents thereof.

For instance, in one implementation described above, the description is made by giving an example where the millimeter-wave radar is employed as the radar 34. However, the technology is not limited to such an implementation. For example, microwave radar and infrared laser radar may be also used.

A part or all of the processes in the vehicle exterior environment recognition process as disclosed herein does not necessarily have to be processed on a time-series basis in the order described in the example flowchart. A part or all of the processes in the vehicle exterior environment recognition process may involve parallel processing or processing based on subroutine.

The calculating unit 31 illustrated in FIG. 1 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the calculating unit 31. Such a medium may take many forms, including, but not limited to, any type of magnetic medium such as a hard disk, any type of optical medium such as a compact disc (CD) and a digital video disc (DVD), any type of semiconductor memory (i.e., semiconductor circuit) such as a volatile memory and a non-volatile memory. The volatile memory may include a dynamic random access memory (DRAM) and a static random access memory (SRAM), and the non-volatile memory may include a ROM and a non-volatile RAM (NVRAM). The ASIC is an integrated circuit (IC) customized to perform, and the FPGA is an integrated circuit designed to be configured after manufacturing in order to perform, all or a part of the functions of the calculating unit 31 illustrated in FIG. 1.

Although some implementations of the technology have been described in the foregoing by way of example with reference to the accompanying drawings, the technology is by no means limited to the implementations described above. The use of the terms first, second, etc. does not denote any order or importance, but rather the terms first, second, etc. are used to distinguish one element from another. It should be appreciated that modifications and alterations may be made by persons skilled in the art without departing from the scope as defined by the appended claims. The technology is intended to include such modifications and alterations in so far as they fall within the scope of the appended claims or the equivalents thereof.

The invention claimed is:

1. A vehicle exterior environment recognition apparatus, comprising:
   radar configured to transmit a radar wave to outside an own vehicle traveling in a first actual lane, receive a first reflected wave and a second reflected wave from a three-dimensional object outside the own vehicle, and output a first representative point and a second representative point that indicate a relative position of the three-dimensional object to the own vehicle according to the first reflected wave and the second reflected wave, respectively;
   a locus calculator configured to calculate a locus of the second representative point, the second representative point being within a set range of the first representative point;
   a lane shape recognizer configured to extract a second actual lane in which the second representative point is present, and recognize a lane shape of the second actual lane, the second actual lane being adjacent the first actual lane;

a rate-of-coincidence calculator configured to calculate a degree of similarity between a shape of the locus of the second representative point and the lane shape of the second actual lane; and a three-dimensional object reality determiner configured to determine, on a basis of the degree of similarity, whether the three-dimensional object corresponding to the second representative point exists within the second actual lane.

2. The vehicle exterior environment recognition apparatus according to claim 1, wherein the rate-of-coincidence calculator calculates a degree of similarity of a quadratic approximated locus of the second representative point with a quadratic approximated lane shape of the second actual lane.

3. The vehicle exterior environment recognition apparatus according to claim 2, wherein the three-dimensional object reality determiner calculates reliability of the locus of the second representative point on the basis of the degree of similarity, and determines, on a basis of a result of comparison of the reliability with a threshold, whether the three-dimensional object corresponding to the second representative point exists within the second actual lane.

4. The vehicle exterior environment recognition apparatus according to claim 1, wherein the three-dimensional object reality determiner calculates reliability of the locus of the second representative point on the basis of the degree of similarity, and determines, on a basis of a result of comparison of the reliability with a threshold, whether the three-dimensional object corresponding to the second representative point exists within the second actual lane.

5. The vehicle exterior environment recognition apparatus according to claim 1, wherein the second representative point is detected subsequent to the first representative point being detected.

6. A vehicle exterior environment recognition apparatus, comprising:

radar configured to transmit a radar wave to outside an own vehicle traveling in a first actual lane, receive a first reflected wave and a second reflected wave from a three-dimensional object outside an own vehicle, and output a first representative point and a second representative point that that indicate a relative position of the three-dimensional object to the own vehicle according to the first reflected wave and the second reflected wave, respectively; and circuitry configured to calculate a locus of the second representative point, the second representative point being within a set range of the first representative point, extract a second actual lane in which the second representative point is present, recognize a lane shape of the second actual lane, the second actual lane being adjacent the first actual lane, calculate a degree of similarity between a shape of the locus of the second representative point and the lane shape of the second actual lane, and determine, on a basis of the degree of similarity, whether the three-dimensional object corresponding to the second representative point exists within the second actual lane.

* * * * *